United States Patent [19]

Kohno

[11] Patent Number: 5,307,269
[45] Date of Patent: Apr. 26, 1994

[54] METHOD FOR CORRECTING CLUTCH CONTROL DATA IN ACCORDANCE WITH DISK TEMPERATURE

[75] Inventor: Hiromi Kohno, Higashimatsuyama, Japan

[73] Assignee: Zexel Corporation, Tokyo, Japan

[21] Appl. No.: 707,814

[22] Filed: May 30, 1991

Related U.S. Application Data

[63] Continuation-in-part of Ser. No. 503,975, Apr. 4, 1990, Pat. No. 5,065,849.

[30] Foreign Application Priority Data

Jun. 6, 1990 [JP] Japan .................. 2-148115

[51] Int. Cl.$^5$ .................. B60K 41/28; B60K 41/08
[52] U.S. Cl. .................. 364/424.1; 192/0.076; 192/0.092; 192/82 T; 74/866
[58] Field of Search .................. 364/424.1; 129/82 T; 192/0.092, 0.052

[56] References Cited

U.S. PATENT DOCUMENTS

| | | | |
|---|---|---|---|
| 4,509,124 | 4/1985 | Suzuki et al. | 364/424.1 |
| 4,576,263 | 3/1986 | Lane et al. | 192/0.044 |
| 4,671,397 | 1/1987 | Asagi et al. | 192/0.092 |
| 4,720,800 | 1/1988 | Suzuki et al. | 364/510 |
| 5,023,789 | 1/1991 | Lampe et al. | 192/82 T |
| 5,060,158 | 10/1991 | Kono et al. | 364/424.1 |
| 5,065,849 | 11/1991 | Kono et al. | 364/424.1 |
| 5,083,273 | 1/1992 | Nishiwaki et al. | 364/424.1 |
| 5,189,611 | 2/1993 | Petzold et al. | 364/424.1 |

FOREIGN PATENT DOCUMENTS 2-80821  1/1990  Japan .

Primary Examiner—Thomas G. Black
Assistant Examiner—Tan Q. Nguyen
Attorney, Agent, or Firm—Pollock, Vande Sande & Priddy

[57] ABSTRACT

In a method for correcting clutch data used for controlling the engaging/disengaging operation of a friction type clutch, meet position data is updated only when the clutch temperature is less than a prescribed value and the clutch data is corrected by the use of the updated meet position data, whereby learned meet position data affected by clutch temperature increase is prevented from being used for the correction of the clutch data. As a result, clutch data is properly corrected regardless of change in the clutch temperature.

16 Claims, 6 Drawing Sheets

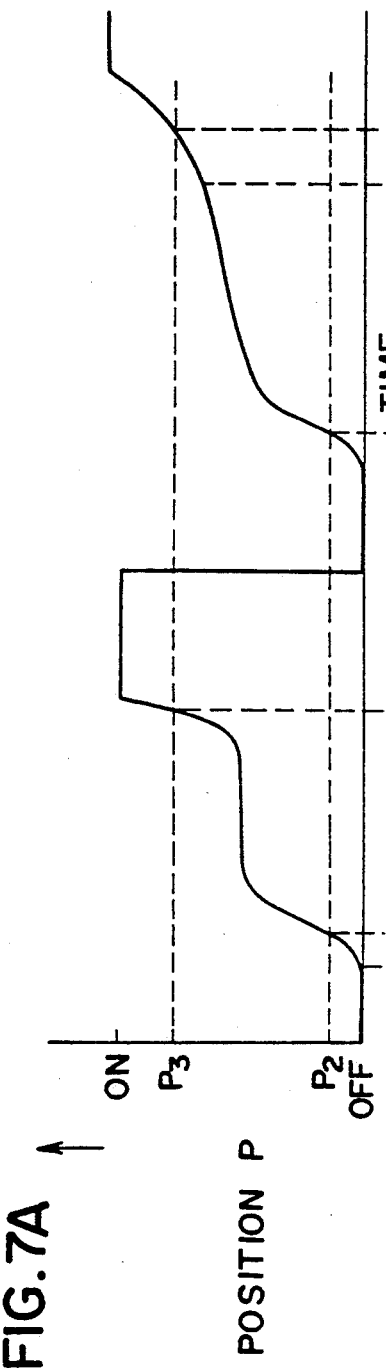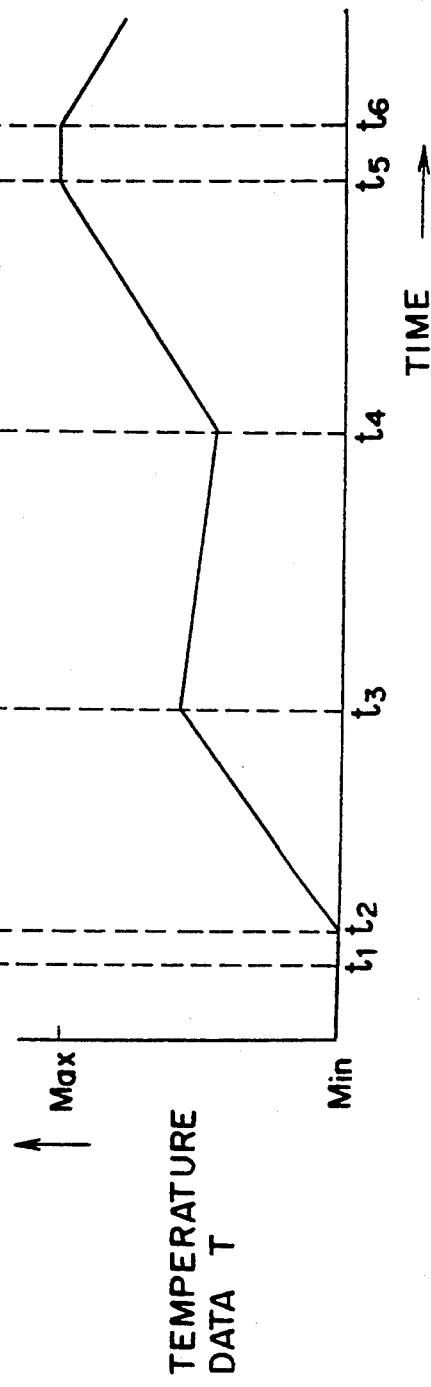
FIG.7A
POSITION P
FIG.7B
TEMPERATURE DATA T

METHOD FOR CORRECTING CLUTCH CONTROL DATA IN ACCORDANCE WITH DISK TEMPERATURE

RELATED APPLICATIONS

This application is a continuation-in-part of U.S. patent application Ser. No. 07/503,975 filed Apr. 4, 1990, now U.S. Pat. No. 5,065,849.

BACKGROUND OF THE INVENTION

1. Field of the Invention

The present invention relates to a method for correcting clutch data used for controlling a clutch, and more particularly to a method for correcting learned data for clutch control operation.

2. Description of the Prior Art

In the prior art there has been widely used a clutch control system for controlling the operation of a friction type clutch in which the clutch is coupled with an actuator and the amount of operation of the clutch is controlled by the actuator in accordance with an electric control signal generated by a control unit. The clutch control system of this type is employed in, for example, a vehicle automatic transmission system. In the case where the operation of the clutch is controlled by the use of the clutch control system of this type, precise clutch data corresponding to the relationship between the position of a member for operating the clutch and the amount of operation of the clutch is required to ensure appropriate clutch control operation. However, variation in this relationship arises because of variation in manufacture, and also with the passage of time due to the wear of the clutch disc and the like.

Accordingly, if precise control of the clutch is required, it is necessary to carry out appropriate correction of the clutch data representing the relationship by, for example, a learning operation. In the prior art, for correcting such clutch data, the meet position of the clutch pressure plate, at which the rotation of the input shaft of the transmission starts by the beginning of the transmission of torque through the clutch owing to the meeting between the pressure plate and the associated clutch disk, is determined by a learning operation which is, for example, conducted each time the selector is set to its neutral (N) position, and the clutch data necessary for controlling the clutch is corrected by the use of the resulting learned data to obtain the corrected or up-dated clutch data.

However, since the learned meet position data greatly depends upon the temperature of the clutch disk, the following disadvantage may arise in the conventional method. Namely, in the case of a vehicles system, for example, the learned meet position data which is obtained by the first learning operation carried out after the vehicle has been parked for long time is quite different from that obtained after repeated vehicle drive-offs. If the latter data is used for the correction of the clutch data, the rotation of the input shaft may begin when the clutch pedal is released only slightly. Accordingly, there is a disadvantage in that large slip of the clutch may occur at vehicle drive-off if the clutch data is corrected by the use of the latter learned data.

SUMMARY OF THE INVENTION

It is an object of the present invention to provide an improved method for correcting data used for controlling clutch operation, which is capable of overcoming the foregoing drawbacks.

It is another object of the present invention to provide a method for correcting data used for controlling the clutch operation by the use of more exact data showing the meet position of the clutch.

It is still another object of the present invention to provide a method for correcting data used for a clutch control operation by taking the temperature of the clutch into account.

According to the present invention, in a method for correcting clutch data including meet position data representing a meet position of a friction type clutch connected with an internal combustion engine, the meet position data is up-dated by a prescribed learning operation only when the temperature of the clutch is less than a prescribed value, and data used for controlling the operation of the clutch is corrected in accordance with the up-dated meet position data. Thus, the meet position data, which is obtained by the learning operation only when the temperature of the clutch is less than the prescribed value is used for correcting the clutch data used for clutch control operation, and learned meet position data affected by clutch temperature increase is prevented from being used for the correction of the clutch data used for clutch control operation.

According to another aspect of the present invention, the temperature of the clutch is detected or estimated by calculation, and the meet position data obtained by a prescribed learning operation is corrected on the basis of the detected or calculated temperature. Thus, the clutch data used for clutch control operation is corrected by the meet position data corrected in accordance with the temperature of the clutch. As a result, the clutch data is properly corrected regardless of changes in the temperature of the clutch.

The invention will be better understood and other objects and advantages thereof will be more apparent from the following detailed description of preferred embodiments with reference to the accompanying drawings.

BRIEF EXPLANATION OF THE DRAWINGS

FIGS. 7A and 7B are graphs for explaining the calculation for estimating the temperature according to the temperature estimation program shown in FIG. 6;

DESCRIPTION OF THE PREFERRED EMBODIMENT

Figure 1:
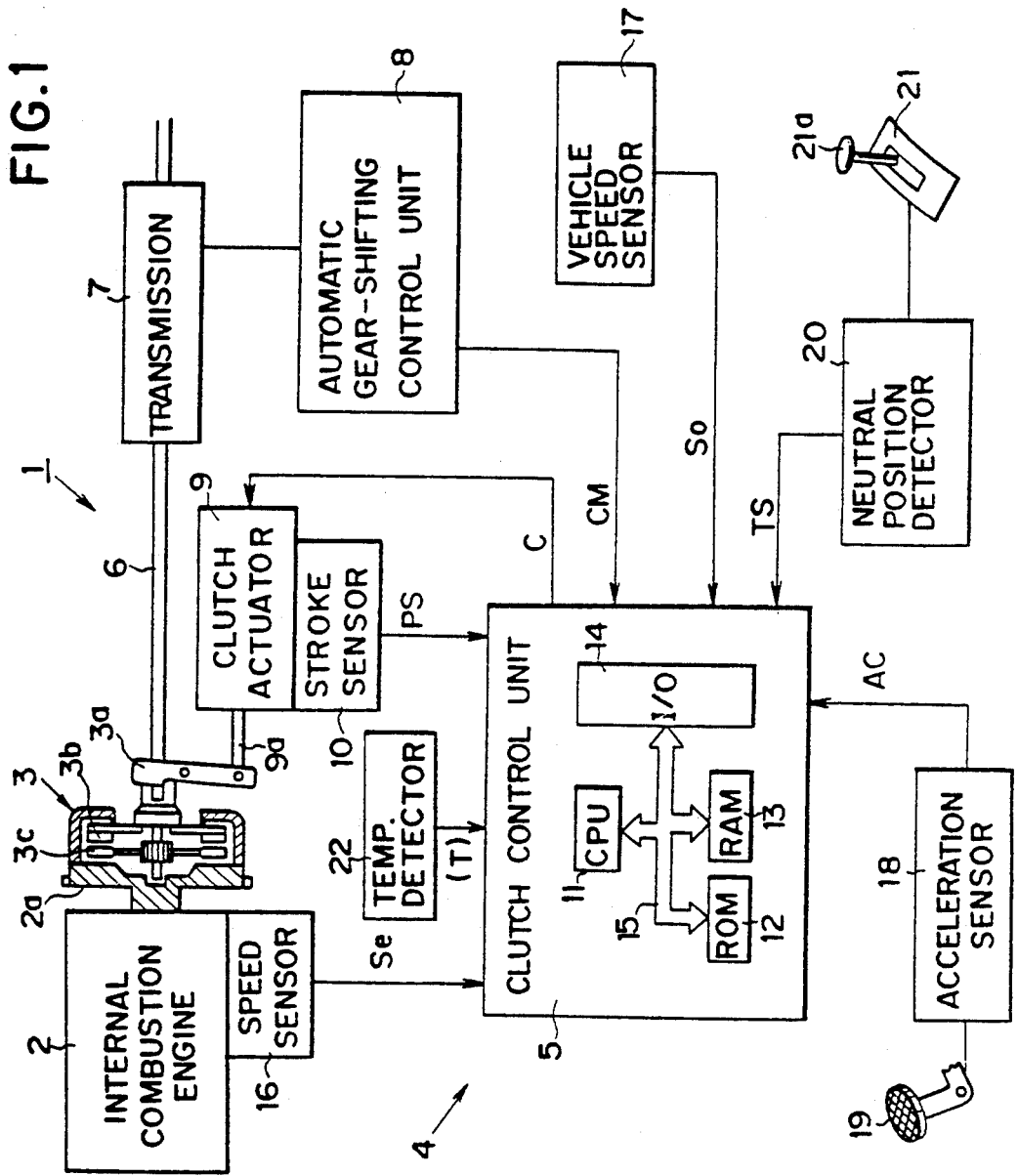
FIG. 1 is a schematic view illustrating an embodiment of a vehicle control system including a clutch control system in which clutch data concerning a friction type clutch is corrected in accordance with the present invention.

FIG. 1 schematically shows an embodiment of a vehicle control system including a clutch controlling system in which clutch data concerning a friction type clutch is corrected according to the method of the present invention. Reference numeral 1 generally designates a vehicle control system for a vehicle (not shown) powered by an internal combustion engine 2, and a friction clutch 3 is mounted on an engine flywheel 2a. The friction clutch 3 is a well-known dry-type single-disc clutch having a clutch release lever 3a, a pressure plate 3b and a clutch disc 3c, and is controlled by a clutch control system 4 including a clutch control unit 5. The clutch 3 is connected by a connecting rod 6 with a gear transmission 7, which is associated with an automatic gear-shifting control unit 8 to form a conventional automatic gear-shifting control system.

In order to control the engaging/disengaging (ON/-OFF) operation of the clutch 3 in response to an electric signal, the clutch control system 4 has a clutch actuator 9 having a piston rod 9a connected with the clutch release lever 3a, and the clutch actuator 9 is responsive to a control signal C generated by the clutch control unit 5 to control the position of the pressure plate 3b, whereby the amount of operation of the clutch 3 can be controlled.

For detecting how the clutch 3 is being operated at each moment, in other words, for detecting the operation condition of the clutch 3, a stroke sensor 10 is coupled with the clutch actuator 9 to detect the operation position of the release lever 3a of the clutch 3 and a position signal PS indicating the operation position of the release lever 3a is produced by the stroke sensor 10. Since the position of the pressure plate 3b, on which the operation condition of the clutch 3 depends, has a predetermined relation with the operation position of the release lever 3a, it follows that the position signal PS from the stroke sensor 10 indicates the position P of the pressure plate 3b.

The position signal PS is supplied to the clutch control unit 5 which includes a central processing unit (CPU) 11, read-only memory (ROM) 12, random access memory (RAM) 13 and I/O interface 14, which are interconnected by a bus 15 to form a conventional microcomputer system.

Associated with the internal combustion engine 2 is a speed sensor 16, which is a sensor of well-known design for detecting the input rotational speed N of the clutch 3 and producing a first speed signal Se indicating this speed. A vehicle speed sensor 17, which is a conventional sensor for detecting the running speed of the vehicle, produces a second speed signal So showing the vehicle running speed. The first and second speed signals Se and So are supplied to the clutch control unit 5 to which an acceleration signal AC indicating the amount of operation of an accelerator pedal 19 is further applied from an acceleration sensor 18, for detecting the amount of operation of the accelerator pedal 19.

Data corresponding to the designed-in relationship between the position P of the pressure plate 3b indicated by the position signal PS and the operation condition of the clutch 3 is stored in the ROM 12 as initial clutch data. The initial clutch data includes first data showing an OFF position $P_1$ of the clutch 3 at which the pressure plate 3b is maximally apart from the clutch disc 3c and the clutch 3 is in its fully disengaged state, second data showing a meet position $P_2$ ($>P_1$) of the clutch 3 which is a position of the pressure plate 3b at which the input shaft of the transmission 7 begins to rotate owing to the fact that the operation of the clutch 3 changes from its disconnected state to its semi-engaged state to cause torque transmitting operation, third data showing a finish position $P_3$ ($>P_2$) of the clutch 3 which is a boundary position between the semi-engaged state and the engaged state of the clutch 3, and fourth data showing an ON position $P_4$ ($>P_3$) at which the pressure plate 3b maximally pushes the clutch disc 3c to obtain the fully engaged state of the clutch 3.

Figure 2:
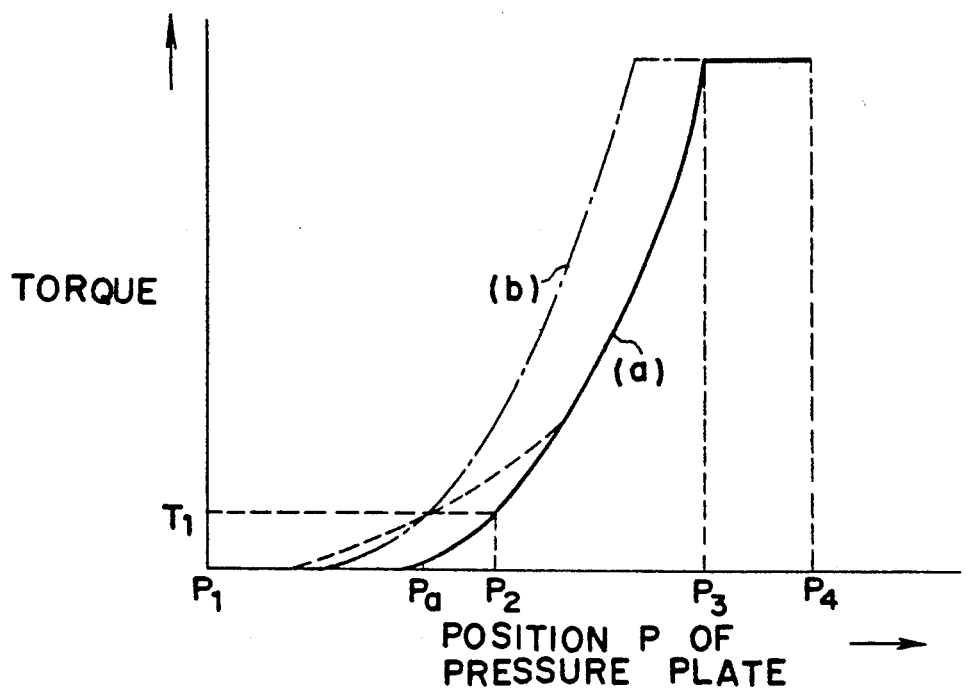
FIG. 2 is a graph showing the relationship between the position of the pressure plate of the clutch shown in FIG. 1 and the torque transmitted through the clutch.

FIG. 2 shows the relationship based on the initial clutch data between the position P of the pressure plate 3b of the clutch 3 and the torque transmitted therethrough.

The initial clutch data stored in the ROM 12 is transferred to the RAM 13 in response to the supply of power to the clutch control unit 5, and the initial clutch data is stored in the RAM 13 as clutch data used for controlling the clutch 3. The clutch control unit 5 is responsive to a command signal CM produced from the automatic gear-shifting control unit 8, and produces the control signal C for controlling the clutch 3 with reference to the clutch data stored in the RAM 13 and the position signal PS so as to obtain the desired operation condition of the clutch 3 in accordance with the command signal CM. In this embodiment, the command signal CM is for commanding the start time of the operation for engaging/disengaging the clutch 3 in order to carry out the automatic gear-shifting operation of the transmission 7.

Since the relationship between the position P of the pressure plate 3a indicated by the position signal PS and the operation condition of the clutch 3 (the torque transmitted through the clutch 3) varies due to, for example, wear of various portions of the clutch 3 with the passage of time, for assuring precise control of the clutch 3, it is necessary to correct the clutch data at appropriate time intervals. For this purpose, the clutch control system 4 shown in FIG. 1 has a neutral position detector 20 coupled with a gear selector 21 having a selecting lever 21a, and a learning timing signal TS is generated from the neutral position detector 20 each time the selecting lever 21a is positioned at its neutral (N) position. The learning timing signal TS is applied to the clutch control unit 5 and a predetermined learning operation for detecting the actual meet position is carried out for predetermined conditions by the clutch control unit 5 to produce learned data showing the resulting learned meet position. The clutch data stored in the RAM 13 is corrected by the use of the learned data.

The learning and correcting operations described above are carried out by the clutch control unit 5 in accordance with a correction program stored in the ROM 12 in advance, which is executed in the microcomputer system of the clutch control unit 5. This correction program is shown in FIG. 3 in the form of a flowchart, and the operation for correcting the clutch data will be now described with reference to the flowchart shown in FIG. 3.

Figure 3:
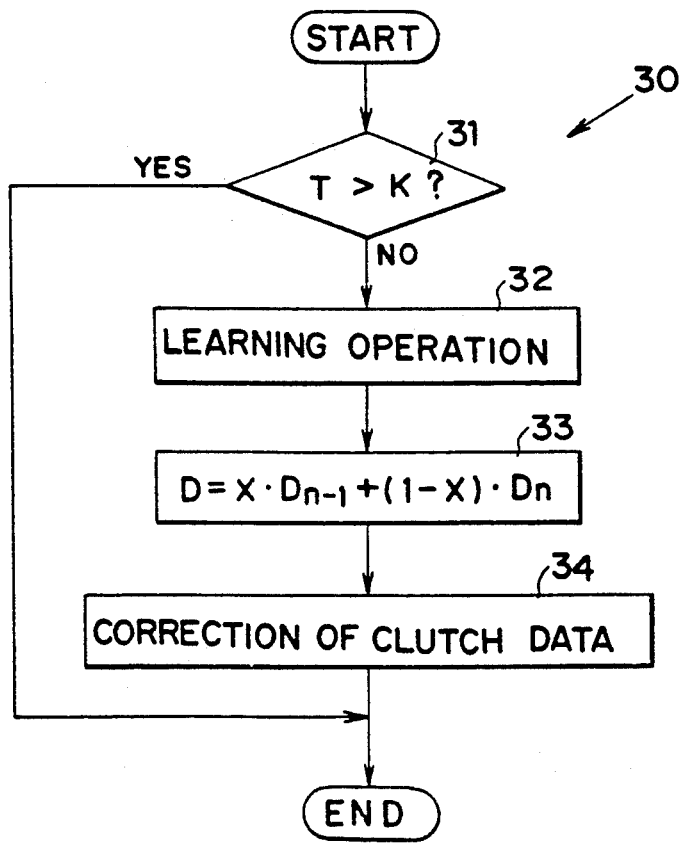
FIG. 3 is a flowchart of a correction processing program executed in the apparatus shown in FIG. 1.

The correction program 30 shown in FIG. 3 is adapted to be executed each time the learning timing signal TS is applied to the clutch control unit 5. After the start of the execution of the correction program 30, the operation moves to step 31 in which discrimination is made as to whether or not the temperature T of the clutch disk 3c of the clutch 3 is higher than a prescribed value K. The temperature of the clutch 3 can be directly detected by means of, for example, a temperature detector 22 using a thermistor in a conventional way, and an electric signal representing the resulting detected temperature is supplied to the clutch control unit 5. The electric signal may be used for the discrimination operation. However, in this embodiment, a calculation for estimating the temperature of the clutch 3 at each instant is carried out in accordance with a temperature estimation program 40 shown in FIG. 6. The determination in step 31 is made on the basis of the resulting estimated temperature data T obtained by the execution of the temperature estimation program 40.

Figure 6:
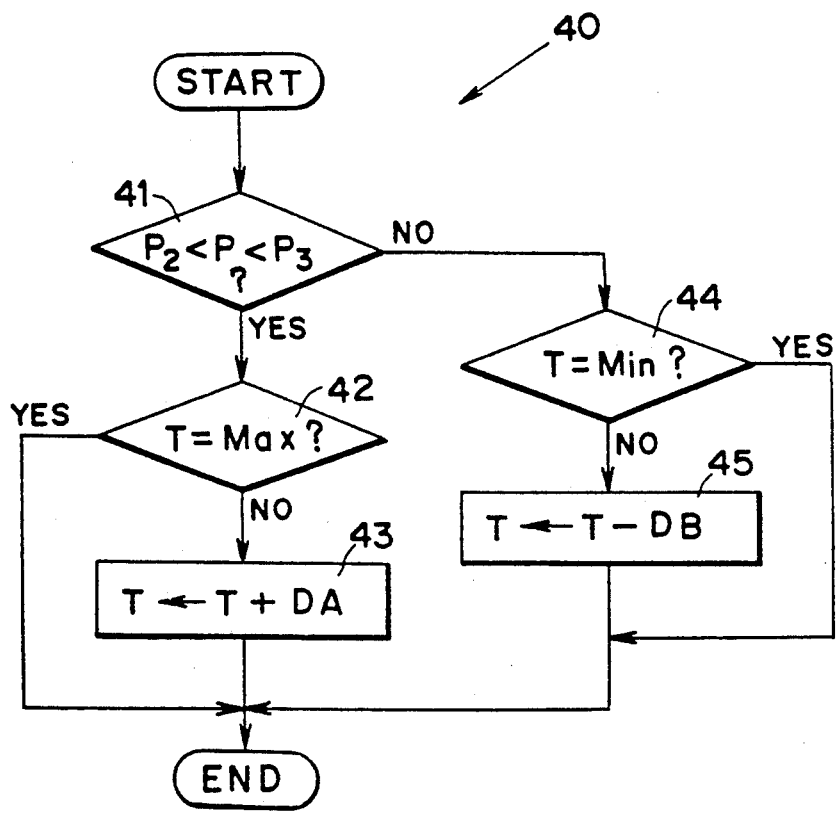
FIG. 6 is a flowchart showing temperature estimation program.

Referring to FIG. 6, the temperature estimation program 40 is adapted to be executed at prescribed time intervals. After the start of the execution of the temperature estimation program 40, the operation moves to step 41 in which discrimination is made, based upon the position P of the pressure plate 3b shown by the position signal PS, as to whether or not the clutch 3 is operating in a semi-engaged state, that is, as to whether or not the position P of the pressure plate 3b is between the positions $P_2$ and $P_3$. The determination in step 41 is YES when the position P of the pressure plate 3b is between $P_1$ and $P_2$, and the operation moves to step 42 in which discrimination is made as to whether or not temperature data T has reached the predetermined maximum value Max. The temperature data T is set at a minimum value Min in an initialization step (not shown). The execution of the temperature estimation program 40 at this time is terminated when the temperature data T has reached Max. When it is found in step 42 that the temperature data T has not reached Max, the operation moves to step 43, in which a value DA is added to the temperature data T and the resulting value is set as up-dated temperature data T. Then, the execution of the program 40 is terminated.

On the other hand, when the position P of the pressure plate 3b is not between $P_2$ and $P_3$, the determination in step 41 is NO and the operation moves to step 44 in which discrimination is made as to whether or not the temperature data T is equal to a predetermined minimum value Min. The execution of the program 40 is terminated at this time when the temperature data T is equal to Min. When the temperature data T is not equal to Min in step 44, the operation moves to step 45, in which a value DB is subtracted from the temperature data T and the resulting value is set as up-dated temperature data T. Then, the execution of the program 40 is terminated.

The operation of the temperature estimation program 40 shown in FIG. 6 will be now described with reference to FIGS. 7A and 7B.

FIG. 7A is a graph showing one example of change in the position P of the pressure plate 3b with the passage of time. Although the determination in step 41 is NO at time $t_1$, where the engagement operation of the clutch 3 starts, the temperature data T does not change because it is equal to Min. When the operation of the clutch 3 enters the semi-engaged condition after $t_2$, the determination in step 41 is YES, so that the temperature data T is stepwisely increased by DA each program cycle. Accordingly, as illustrated in FIG. 7B, the temperature data T increases at a predetermined rate with the passage of time after $t_2$.

The determination in step 41 becomes NO when the clutch 3 leaves the semi-engaged operation zone at $t_3$, so that the temperature data T decreases stepwisely by DB each program cycle. In this embodiment, since DA is greater than DB, the decreasing rate of the temperature data T is smaller than the increasing rate thereof. When the operation of the clutch 3 enters the semi-engaged operation condition after $t_4$, the temperature data T increases for the same reason as described above. However, since the temperature data T cannot exceed Max, the increase in the temperature T halts even if the clutch 3 is operated in the semi-engaged condition after the temperature data T has reached Max. The decrease in the temperature data T starts after the position P of the pressure plate 3b leaves the semi-engaged range at $t_6$.

As will be understood from the foregoing description, DA represents an increment in the temperature data T per unit time during the semi-engaged operation of the clutch 3, while DB represents a decrement in the temperature data T per unit time in the operation condition of the clutch 3 other than the semi-engaged operation condition. Thus, the increase in the temperature of the clutch 3 during the semi-engaged operation and the decrease in the temperature thereof in cases other than the semi-engaged operation are simulated by the values DA and DB, and the temperature of the clutch 3 is estimated by calculation.

Returning to FIG. 3, when the temperature data T is smaller than K, wherein K is a value between Min and Max, the operation moves to step 32 in which the learning operation for obtaining the actual meet position is carried out by producing the control signal C so as to cause the clutch 3 to operate and then detecting the actual meet position of the clutch 3. Thus, the actual meet position is determined in a conventional manner on the basis of the first speed signal Se and the position signal PS, which are supplied to the clutch control unit 5 at that time. As a result, the learned data $D_n$ representing the current meet position is obtained. That is, the learned data $D_n$ shows the actual value of the position $P_2$ at this time.

In step 33, calculation for obtaining meet position data D used for the correction of the clutch data is carried out in accordance with the following formula:

$$D = X \cdot D_{n-1} + (1-X) \cdot D_n$$

wherein, $D_n$ is the value of the learned meet position data obtained by the processing operation in step 32 in the last program cycle, $D_{n-1}$ is the value of the learned data obtained by the processing operation in step 32 in the preceding program cycle, and X is a coefficient, which is determined appropriately in the range between 0 and 1.

The meet position data D obtained in step 33 is stored in the RAM 13 as up-dated learned meet position data representing the position $P_2$, and the clutch data stored in the RAM 13 by the transfer operation is corrected on the basis of the meet position data D in step 34.

Steps 32 to 34 are not executed when it is determined in step 31 that the temperature data T is greater than K, and it follows that the correction of the clutch data is not carried out.

According to the arrangement constitution described in the foregoing, the learned data is obtained only when the temperature data T is not greater than K, and the correction of the clutch data is performed by the use of the up-dated meet position data D obtained on the basis of the learned data. As a result, it follows that neither the learning operation for obtaining the actual value of the position $P_2$ nor the correction operation of the clutch data is not carried out in the case where a part of the characteristic curve of the clutch 3 changes as shown by the dotted line in FIG. 2 because of an increase in the temperature of the clutch 3. Therefore, as shown in FIG. 2, even if the position $P_2$ shifts to the position Pa as a result of clutch temperature increase, the clutch characteristic curve (a) in FIG. 2 is prevented from being corrected to the characteristic curve (b) in FIG. 2 as a result the shift of the position $P_2$, regardless of the change in a part of the clutch characteristic curve.

As a result, since correction is limited only to that for compensating for wear of the clutch disk 3a, there is no possibility of the correction of the clutch data based on the learned data causing slip of the clutch 3 at vehicle drive-off.

Figure 4:
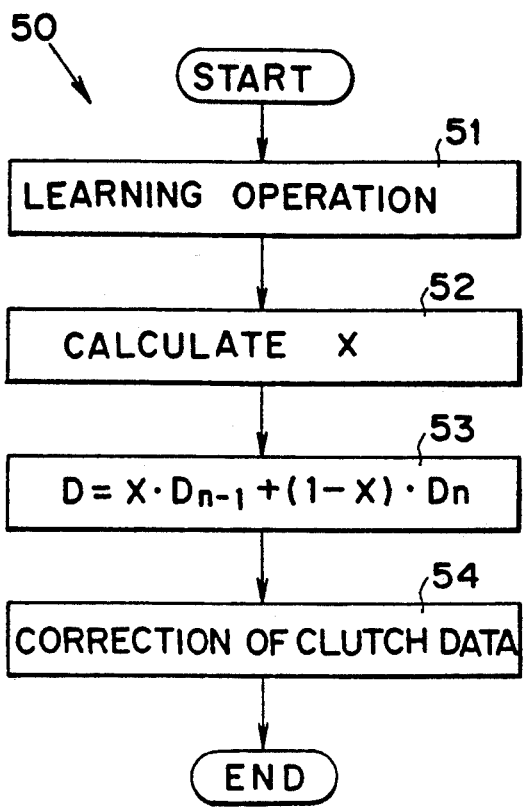
FIG. 4 is a flowchart of another correction processing program executed in the apparatus shown in FIG. 1.

FIG. 4 is a flowchart showing another correction program 50 for correcting the clutch data by the use of the learned data representing the current meet position according to the present invention.

The correction processing program 50 is executed each time the learning timing signal TS is applied to the clutch control unit 5. After the start of the execution of the program 50, the operation moves to step 51 in which the learning operation is carried out in a similar manner as that executed in step 32 of the correction program 30 shown in FIG. 3. After this, the operation moves to step 52 in which a coefficient X is calculated on the basis of data indicating the temperature of the clutch 3, which may be data estimated by the execution of the temperature estimation program 40 or data based on the actual temperature of the clutch 3 detected by the temperature detector 22.

Figure 5:
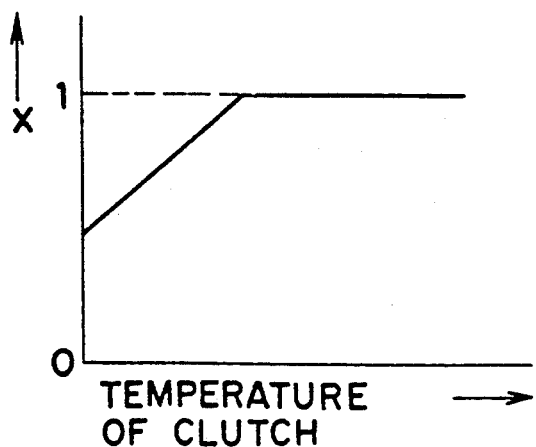
FIG. 5 is a characteristic curve showing the relationship between the temperature of the clutch and the coefficient used for calculating the meet position data.

In step 52 a map calculation for determining the value of the coefficient X is carried out using map data corresponding to the relationship between the temperature of the clutch 3 and the coefficient X as shown in FIG. 5. After this, the meet position data D representing the meet position of the clutch 3, which is used for the correction of the clutch data, is calculated in step 53 in a similar manner to that in step 33 of the program shown in FIG. 3. The operation then moves to step 54 in which the data processing operation for correcting the clutch data by the use of the meet position data D is carried out in a similar manner to that in step 34 of the program 30 of FIG. 3.

As will be understood from the foregoing description, the data processing operation according to the correction program 50 is different from that of the program 30 in that the meet position data D is calculated by the use of the coefficient X depending upon the temperature of the clutch and the clutch data is corrected in accordance with the meet position data D obtained in step 53 even if the temperature of the clutch 3 is high.

The estimation of the temperature of the clutch 3 can be accomplished in a manner other than that according to the program 40 of FIG. 6.

Figure 8:
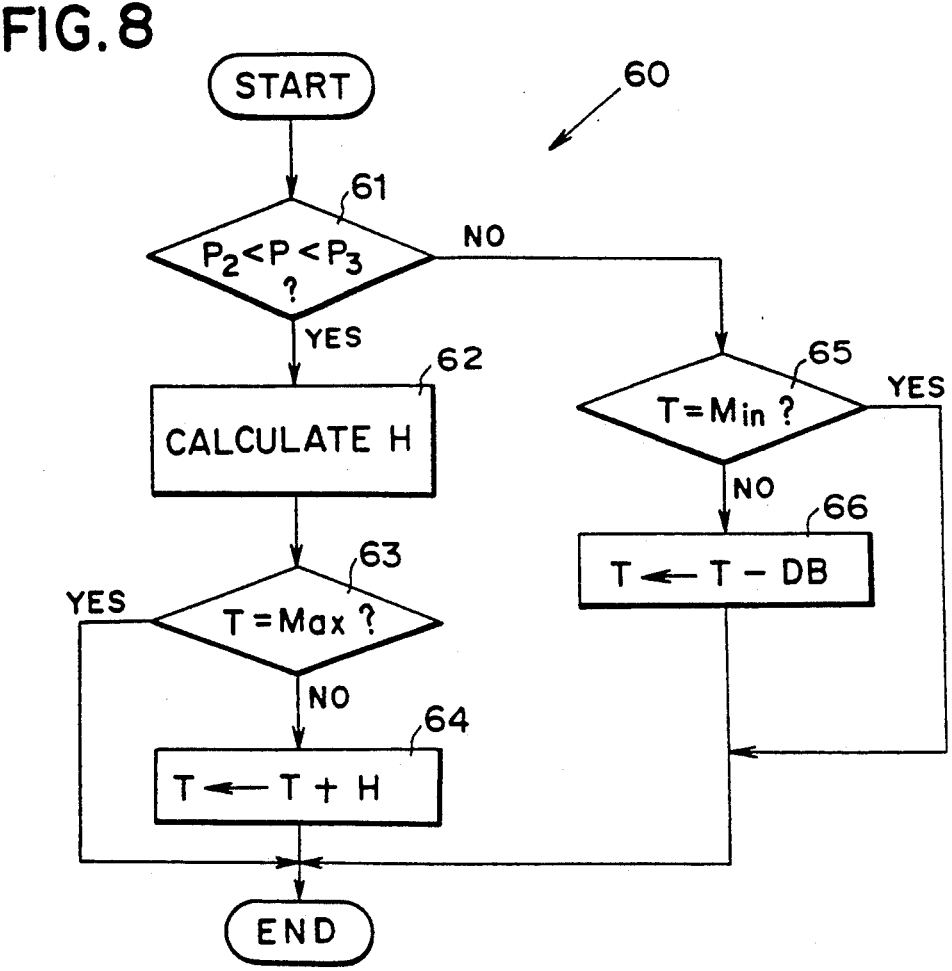
FIG. 8 is a flowchart showing another temperature estimation program.

FIG. 8 is a flowchart showing another temperature estimation program 60 for estimating the temperature of the clutch, which will be now explained. After the start of the execution of the program 60, the operation moves to step 61 in which discrimination is made as to whether or not the clutch 3 is in the semi-engaged state in a similar manner to that in step 41 of the temperature estimation program 40 of FIG. 6. When the position P is between $P_2$ and $P_3$, the operation moves to step 62 in which a value H is calculated.

Figure 9:
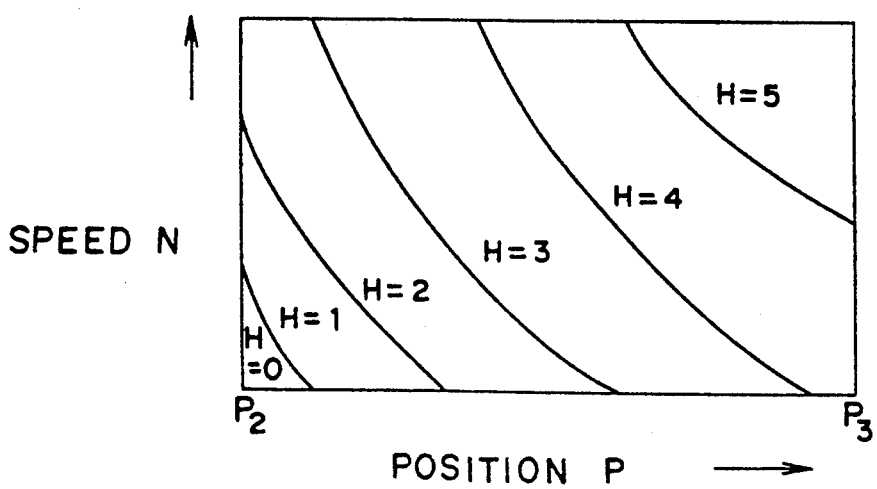
FIG. 9 is a graph showing characteristic curves for obtaining the correction value used in the program shown in FIG. 8.

As illustrated in FIG. 9, the value of H is a function of the position P and the input rotational speed N, and a map calculation for determining the value of H is carried out in step 62 in accordance with map data corresponding to the characteristic curves shown in FIG. 9.

Then, the operation moves to step 63 in which discrimination is made as to whether or not temperature data T has reached the predetermined maximum value Max. The temperature data T is set at a the minimum value Min in an initialization step (not shown). If the temperature data T has reached Max, the execution of the temperature estimation program 60 is terminated at this time. In contrast, when it is found in step 63 that temperature data T has not reached Max, the operation moves to step 64, in which a value H is added to the temperature data T and the resulting value is set as up-dated temperature data T. Then, the execution of the program 60 is terminated.

On the other hand, when the position P of the pressure plate 3b is not between $P_2$ and $P_3$, the determination in step 61 is NO and the operation moves to step 65 in which discrimination is made as to whether or not the temperature data T is equal to a predetermined minimum value Min. The execution of the program 60 is terminated at this time if the temperature data T is equal to Min. When the temperature data T is found not to equal Min in step 65, the operation moves to step 66, in which a value DB is subtracted from the temperature data T and the resulting value is set as up-dated temperature data T. Then, the execution of the program 60 is terminated.

As will be understood from the foregoing description, according to the temperature estimation program 60 shown in FIG. 8, since the temperature increase of the clutch 3 per unit time during its semi-engaged state is determined in accordance with characteristic curves depending upon the position P and the rotational speed N, more exact estimation of the temperature of the clutch 3 can be realized than in the case where the program 40 is used.

What is claimed is:

1. A method for correcting clutch data including meet position data representing a meet position of a friction type clutch connected with an internal combustion engine, said method comprising the steps of:

obtaining temperature data representing a temperature of the clutch;

discriminating whether or not the temperature data is in a prescribed range defined by a predetermined maximum value and a predetermined minimum value;

updating the meet position data by a predetermined learning operation only when the temperature data is in the prescribed range; and, correcting the clutch data by the use of an updated meet position data obtained in said updating step;

said data obtaining step comprising a preliminary step for discriminating whether or not the clutch is operating in a semi-engaged condition, a step responsive to a result of the discrimination in said preliminary step for incrementing the temperature data by a prescribed amount at prescribed time intervals when the clutch is operating in the semi-engaged condition, and a step responsive to the result of the discrimination in said preliminary step for decrementing the temperature data by a prescribed amount at prescribed time intervals when the clutch is not operating in the semi-engaged condition.

2. A method as claimed in claim 1, wherein the temperature data is obtained by directly detecting the temperature of the clutch by means of a temperature detecting means associated with the clutch.

3. A method as claimed in claim 1, wherein the temperature data is obtained by calculation using an estimated rate of clutch temperature increase during the semi-engaged condition of clutch operation and an estimated rate of clutch temperature decrease during operation of the clutch in other than the semi-engaged condition.

4. A method as claimed in claim 1, wherein the amount by which the temperature data is incremented per unit time is set to be greater than the amount by which the temperature data is decremented per unit time.

5. A method as claimed in claim 1, wherein said incrementing step is executed only when the temperature data is smaller than said predetermined maximum value.

6. A method as claimed in claim 1, wherein said decrementing step is executed only when the temperature data is greater than said predetermined minimum value.

7. A method as claimed in claim 1, wherein the prescribed amount in said incrementing step is determined depending upon an amount of operation of the clutch and an input rotational speed of the clutch.

8. A method for correcting clutch data including meet position data representing a meet position of a friction type clutch connected with an internal combustion engine, said method comprising the steps of:
updating the meet position data by a predetermined learning operation;
obtaining temperature data representing a temperature of the clutch;
calculating a coefficient value in accordance with a predetermined relationship between coefficient value and clutch temperature in response to the temperature data;
determining meet position data on the basis of a current updated meet position data obtained by said updating step and the coefficient value calculated in said calculating step in such a way that the current updated meet position data is taken into account when the temperature represented by the temperature data is below a predetermined level; and,
correcting the clutch data by the use of the meet position data obtained in said predetermined step;
said data obtaining step comprising a preliminary step for discriminating whether or not the clutch is operating in a semi-engaged condition, a step responsive to a result of the discrimination in said preliminary step for incrementing the temperature data by a prescribed amount at prescribed time intervals when the clutch is operating in the semi-engaged condition, and a step responsive to the result of the discrimination in said preliminary step for decrementing the temperature data by a prescribed amount at prescribed time intervals when the clutch is not operating in the semi-engaged condition.

9. A method as claimed in claim 8, wherein the temperature data is obtained by directly detecting the temperature of the clutch by means of a temperature detecting means associated with the clutch.

10. A method as claimed in claim 8, wherein the temperature data is obtained by calculation using an estimated rate of clutch temperature increase during the semi-engaged condition of clutch operation and an estimated rate of clutch temperature decrease during operation of the clutch in other than the semi-engaged condition.

11. A method as claimed in claim 8, wherein the amount by which the temperature data is incremented per unit time is set to be greater than the amount by which the temperature data is decremented per unit time.

12. A method as claimed in claim 8, wherein said incrementing step is executed only when the temperature data is smaller than said predetermined maximum value.

13. A method as claimed in claim 8, wherein said decrementing step is executed only when the temperature data is greater than said predetermined minimum value.

14. A method as claimed in claim 8, wherein the prescribed amount in said incrementing step is determined depending upon an amount of operation of the clutch and an input rotational speed of the clutch.

15. A method for correcting clutch data including meet position data representing a meet position of a friction type clutch connected with an internal combustion engine, said method comprising the steps of:
obtaining temperature data representing a temperature of the clutch;
discriminating whether or not the temperature data is in a prescribed range defined by a predetermined maximum value and a predetermined minimum value;
updating the meet position data by a predetermined learning operation only when the temperature data is in the prescribed range; and,
correcting the clutch data by the use of an updated meet position data obtained in said updating step;
said temperature data being obtained by calculation using an estimated rate of clutch temperature increase during a semi-engaged condition of clutch operation and an estimated rate of clutch temperature decrease during operation of the clutch in other than the semi-engaged condition.

16. A method for correcting clutch data including meet position data representing a meet position of a friction type clutch connected with an internal combustion engine, said method comprising the steps of:
updating the meet position data by a predetermined learning operation;
obtaining temperature data representing a temperature of the clutch;
calculating a coefficient value in accordance with a predetermined relationship between coefficient value and clutch temperature in response to the temperature data;
determining meet position data on the basis of a current updated meet position data obtained by said updating step and the coefficient value calculated in said calculating step in such a way that the current updated meet position data is taken into account when the temperature represented by the temperature data is below a predetermined level; and,
correcting the clutch data by the use of the meet position data obtained in said predetermining step;
said temperature data being obtained by calculation using an estimated rate of clutch temperature increase during a semi-engaged condition of clutch operation and an estimated rate of clutch temperature decrease during operation of the clutch in other than the semi-engaged condition.

* * * * *

UNITED STATES PATENT AND TRADEMARK OFFICE
CERTIFICATE OF CORRECTION

PATENT NO. : 5,307,269
DATED      : April 26, 1994
INVENTOR(S): HIROMI KOHNO

It is certified that error appears in the above-identified patent and that said Letters Patent is hereby corrected as shown below:

Column 9, line 48, change "predetermined" to --determining--.

Column 10, line 61, change "predetermining" to --determining--.

Signed and Sealed this

Twenty-sixth Day of July, 1994

Attest:

BRUCE LEHMAN

Attesting Officer

Commissioner of Patents and Trademarks